United States Patent
Yagley et al.

(10) Patent No.: US 6,634,965 B2
(45) Date of Patent: *Oct. 21, 2003

(54) GOLF BALL

(75) Inventors: Michael S. Yagley, Cardiff, CA (US); Steven S. Ogg, Carlsbad, CA (US); Pijush K. Dewanjee, Carlsbad, CA (US); David M. Bartels, Carlsbad, CA (US); Geoffrey P. M. Goodman, Rancho Santa Fe, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/063,733

(22) Filed: May 8, 2002

(65) Prior Publication Data

US 2002/0165045 A1 Nov. 7, 2002

Related U.S. Application Data

(63) Continuation-in-part of application No. 09/847,094, filed on May 1, 2001, which is a continuation-in-part of application No. 09/768,846, filed on Jan. 23, 2001.

(51) Int. Cl.[7] .......................... A63B 37/12; A63B 37/14; A63B 37/00
(52) U.S. Cl. ........................................ 473/378; 473/351
(58) Field of Search ................................... 473/351–383

(56) References Cited

U.S. PATENT DOCUMENTS

| | | | |
|---|---|---|---|
| 2,002,726 A | * 5/1935 | Young | ........................ 473/383 |
| 4,266,773 A | 5/1981 | Treadwell | |
| 4,570,937 A | 2/1986 | Yamada | |
| 4,690,981 A | 9/1987 | Statz | |
| 4,722,529 A | 2/1988 | Shaw et al. | |
| 4,787,638 A | 11/1988 | Kobayashi | |
| 4,830,378 A | 5/1989 | Aoyama | |
| 4,836,552 A | 6/1989 | Puckett et al. | |
| 5,143,377 A | 9/1992 | Oka et al. | |
| 5,338,039 A | 8/1994 | Oka et al. | |
| 5,356,150 A | 10/1994 | Lavalle et al. | |
| 5,368,304 A | 11/1994 | Sullivan et al. | |
| 5,377,989 A | 1/1995 | Machin | |
| 5,470,076 A | 11/1995 | Cadorniga | |
| 5,536,013 A | 7/1996 | Pocklington | |
| 5,722,903 A | 3/1998 | Moriyama et al. | |
| D406,623 S | 3/1999 | Steifel | |
| 5,890,975 A | 4/1999 | Steifel | |
| 5,916,044 A | 6/1999 | Shimosaka et al. | |
| 5,971,870 A | 10/1999 | Sullivan et al. | |
| 6,152,835 A | 11/2000 | Sullivan et al. | |
| 6,213,892 B1 | * 4/2001 | Felker et al. | ................ 473/370 |
| 6,290,615 B1 | * 9/2001 | Ogg | ........................... 473/378 |
| 6,443,858 B2 | * 9/2002 | Bartels et al. | .............. 473/351 |
| 6,461,253 B2 | * 10/2002 | Ogg | ........................... 473/378 |
| 6,478,697 B2 | * 11/2002 | Yagley et al. | ............... 473/376 |
| 6,517,451 B2 | * 2/2003 | Cavallaro et al. | ........... 473/371 |

OTHER PUBLICATIONS

Farrally, M. R. et al., Science and Golf III: Proceeding of the Scientific Congress of Golf. Illinois: Human Kinetics, copyright 1999, p. 412, 482–484.*

* cited by examiner

Primary Examiner—Paul T. Sewell
Assistant Examiner—Alvin A. Hunter, Jr.
(74) Attorney, Agent, or Firm—Michael A. Catania; Elaine H. Lo

(57) ABSTRACT

The present invention is a golf ball having a core, a cover and a lattice structure aerodynamic pattern. The core has a diameter of 1.53 inches to 1.55 inches, and a PGA compression of 60 to 75 points. The cover has a thickness of 0.060 inch to 0.090 inch. The cover has a Shore D hardness less than 58 as measured on the golf ball. The golf ball has a COR that is greater than 0.782 points at 143 feet per second.

4 Claims, 9 Drawing Sheets

○ BALL: Precept MC  ◇ BALL: Top Flite  ▲ BALL: Maxfli XS  ◆ BALL: Precept EV
□ BALL: Titleist HP  △ BALL: Nike Spin  ■ BALL: Wilson Staff  ● BALL: Present Invention O BALL: Precept MC ◇ BALL: Top Flite □ BALL: Titleist HP ◆ BALL: Precept EV
▲ BALL: Maxfli XS △ BALL: Nike Spin ■ BALL: Wilson Staff ● BALL: Present
Tour                                                                Invention O BALL: Precept MC ◇ BALL: Top Flite □ BALL: Titleist HP ◆ BALL: Precept EV
▲ BALL: Maxfli XS △ BALL: Nike Spin ■ BALL: Wilson Staff     BALL: Present
Tour                                                                Invention

GOLF BALL

CROSS REFERENCE TO RELATED APPLICATIONS

The Present Application is a continuation-in-part application of U.S. patent application Ser. No. 09/847,094, filed on May 1, 2001, which is a continuation-in-part application of U.S. patent application Ser. No. 09/768,846, filed on Jan. 23, 2001.

FEDERAL RESEARCH STATEMENT

[Not Applicable]

BACKGROUND OF INVENTION

1. Field of the Invention

The present invention relates to a golf ball. More specifically, the present invention relates to a two-piece golf ball with a cover layer composed of an ionomer blend, a core containing polybutadiene, tungsten, and other materials, and a tubular lattice structure aerodynamic pattern.

2. Description of the Related Art

Two-piece golf balls with ionomer covers have been in existence since the 1960's. The core is typically solid, and the cover is usually a hard ionomer material. The two-piece golf balls of the prior art provide added distance while giving up feel.

The traditional golf ball, as readily accepted by the consuming public, is spherical with a plurality of dimples, with each dimple having a circular cross-section. Many golf balls have been disclosed that break with this tradition, however, for the most part these non-traditional golf balls have been commercially unsuccessful.

Most of these non-traditional golf balls still attempt to adhere to the Rules Of Golf as set forth by the United States Golf Association (USGA) and The Royal and Ancient Golf Club of Saint Andrews (R&A). As set forth in Appendix III of the Rules of Golf, the weight of the ball shall not be greater than 1.620 ounces avoirdupois (45.93 gm), the diameter of the ball shall be not less than 1.680 inches (42.67 mm) which is satisfied if, under its own weight, a ball falls through a 1.680 inches diameter ring gauge in fewer than 25 out of 100 randomly selected positions, the test being carried out at a temperature of 23±1° C., and the ball must not be designed, manufactured or intentionally modified to have properties which differ from those of a spherically symmetrical ball. Also, the Rules of Golf limit the initial velocity of a golf ball to 250 feet (76.2 m) per second (a two percent maximum tolerance allows for an initial velocity of 255 per second) and the overall distance to 280 yards (256 m) plus a six percent tolerance for a total distance of 296.8 yards (the six percent tolerance may be lowered to four percent). A complete description of the Rules of Golf is available on the USGA web page at ww_Hlt509050176w_ Hlt509050176.usga.org or at the R&A web page at www.randa.org. Thus, the initial velocity and overall distance of a golf ball must not exceed these limits in order to conform to the Rules of Golf.

One example is Shimosaka et al., U.S. Pat. No. 5,916,044, for a Golf Ball that discloses the use of protrusions to meet the 1.68 inch (42.67 mm) diameter limitation of the USGA and R&A. The Shimosaka patent discloses a golf ball with a plurality of dimples on the surface and a few rows of protrusions that have a height of 0.001 to 1.0 mm from the surface. Thus, the diameter of the land area is less than 42.67 mm.

Another example of a non-traditional golf ball is Puckett et al., U.S. Pat. No. 4,836,552 for a Short Distance Golf Ball, which discloses a golf ball having brambles instead of dimples in order to reduce the flight distance to half of that of a traditional golf ball in order to play on short distance courses.

Another example of a non-traditional golf ball is Pocklington, U.S. Pat. No. 5,536,013 for a Golf Ball, which discloses a golf ball having raised portions within each dimple, and also discloses dimples of varying geometric shapes such as squares, diamonds and pentagons. The raised portions in each of the dimples of Pocklington assists in controlling the overall volume of the dimples.

Another example is Kobayashi, U.S. Pat. No. 4,787,638 for a Golf Ball, which discloses a golf ball having dimples with indentations within each of the dimples. The indentations in the dimples of Kobayashi are to reduce the air pressure drag at low speeds in order to increase the distance.

Yet another example is Treadwell, U.S. Pat. No. 4,266,773 for a Golf Ball, which discloses a golf ball having rough bands and smooth bands on its surface in order to trip the boundary layer of air flow during flight of the golf ball.

Aoyama, U.S. Pat. No. 4,830,378, for a Golf Ball With Uniform Land Configuration, discloses a golf ball with dimples that have triangular shapes. The total flat land area of Aoyama is no greater than 20% of the surface of the golf ball, and the objective of the patent is to optimize the uniform land configuration and not the dimples.

Another variation in the shape of the dimples is set forth in Steifel, U.S. Pat. No. 5,890,975 for a Golf Ball And Method Of Forming Dimples Thereon. Some of the dimples of Steifel are elongated to have an elliptical cross-section instead of a circular cross-section. The elongated dimples make it possible to increase the surface coverage area. A design patent to Steifel, U.S. Pat. No. 406,623, has all elongated dimples.

A variation on this theme is set forth in Moriyama et al., U.S. Pat. No. 5,722,903, for a Golf Ball, which discloses a golf ball with traditional dimples and oval shaped dimples.

A further example of a non-traditional golf ball is set forth in Shaw et al., U.S. Pat. No. 4,722,529, for Golf Balls, which discloses a golf ball with dimples and 30 bald patches in the shape of a dumbbell for improvements in aerodynamics.

Another example of a non-traditional golf ball is Cadorniga, U.S. Pat. No. 5,470,076, for a Golf Ball, which discloses each of a plurality of dimples having an additional recess. It is believed that the major and minor recess dimples of Cadorniga create a smaller wake of air during flight of a golf ball.

Oka et al., U.S. Pat. No. 5,143,377, for a Golf Ball, discloses circular and non-circular dimples. The non-circular dimples are square, regular octagonal, regular hexagonal and amount to at least forty percent of the 332 dimples on the golf ball of Oka. These non-circular dimples of Oka have a double slope that sweeps air away from the periphery in order to make the air turbulent.

Machin, U.S. Pat. No. 5,377,989, for Golf Balls With Isodiametrical Dimples, discloses a golf ball having dimples with an odd number of curved sides and arcuate apices to reduce the drag on the golf ball during flight.

Lavallee et al., U.S. Pat. No. 5,356,150, discloses a golf ball having overlapping elongated dimples to obtain maximum dimple coverage on the surface of the golf ball.

Oka et al., U.S. Pat. No. 5,338,039, discloses a golf ball having at least forty percent of its dimples with a polygonal shape. The shapes of the Oka golf ball are pentagonal, hexagonal and octagonal.

Although the prior art has set forth numerous variations for the surface of a golf ball, there remains a need for a two-piece golf ball having a surface that minimizes the volume needed to trip the boundary layer of air at low speed while providing a low drag level at high speeds.

SUMMARY OF INVENTION

One aspect of the present invention is a golf ball having a core, a cover and a lattice structure aerodynamic pattern. The core has a diameter of 1.53 inches to 1.55 inches. The core is composed of polybutadiene, zinc oxide in an amount of 7 to 15 parts per hundred parts of polybutadiene, zinc diacryalate in an amount of 30 to 50 parts per hundred parts of polybutadiene, an initiator in an amount of 0.1 to 1.0 parts per hundred parts of polybutadiene, and tungsten in an amount of 5 to 10 parts per hundred parts of polybutadiene. The core has a PGA compression of 60 to 75 points. The cover has a thickness of 0.060 inch to 0.090 inch. The cover is composed of an ionomer blend formed from a high acid ionomer resin neutralized with sodium and a terpolymer neutralized with magnesium. The cover has a Shore D hardness ranging from 52 to 58. The golf ball has a COR at 143 feet per second that is greater than 0.782 points.

Having briefly described the present invention, the above and further objects, features and advantages thereof will be recognized by those skilled in the pertinent art from the following detailed description of the invention when taken in conjunction with the accompanying drawings.

DETAILED DESCRIPTION

Figure 1:
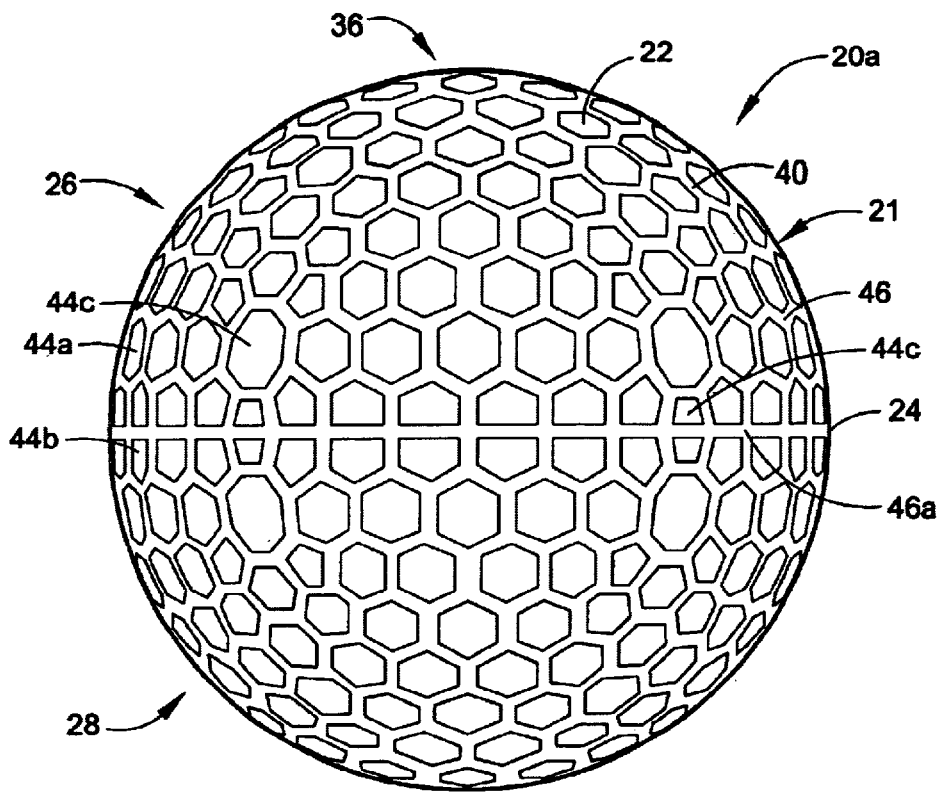
FIG. 1 is an equatorial view of a preferred embodiment of a golf ball of the present invention.
Figure 1A:
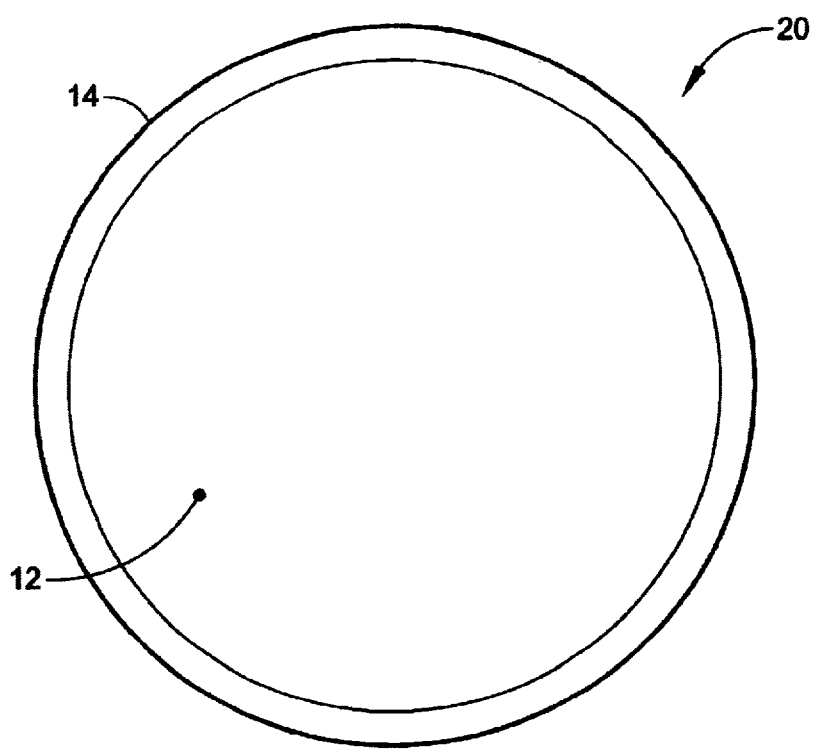
FIG. 1A is a cross-sectional view of a golf ball of the present invention.
Figure 2:
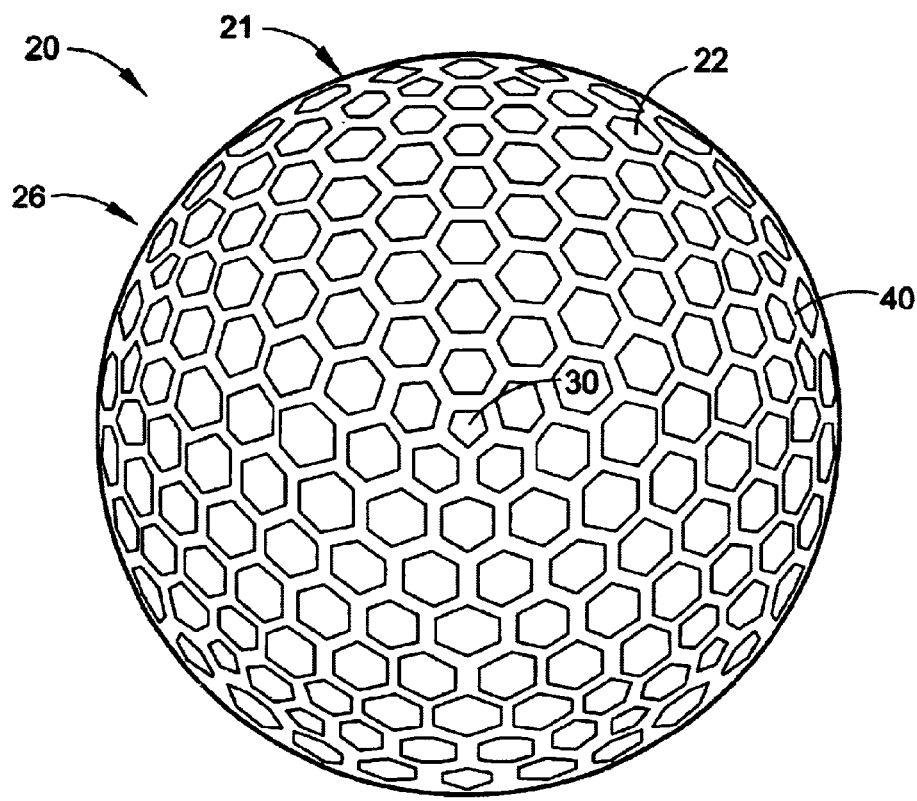
FIG. 2 is a polar view of the golf ball of FIG. 1.
Figure 3:
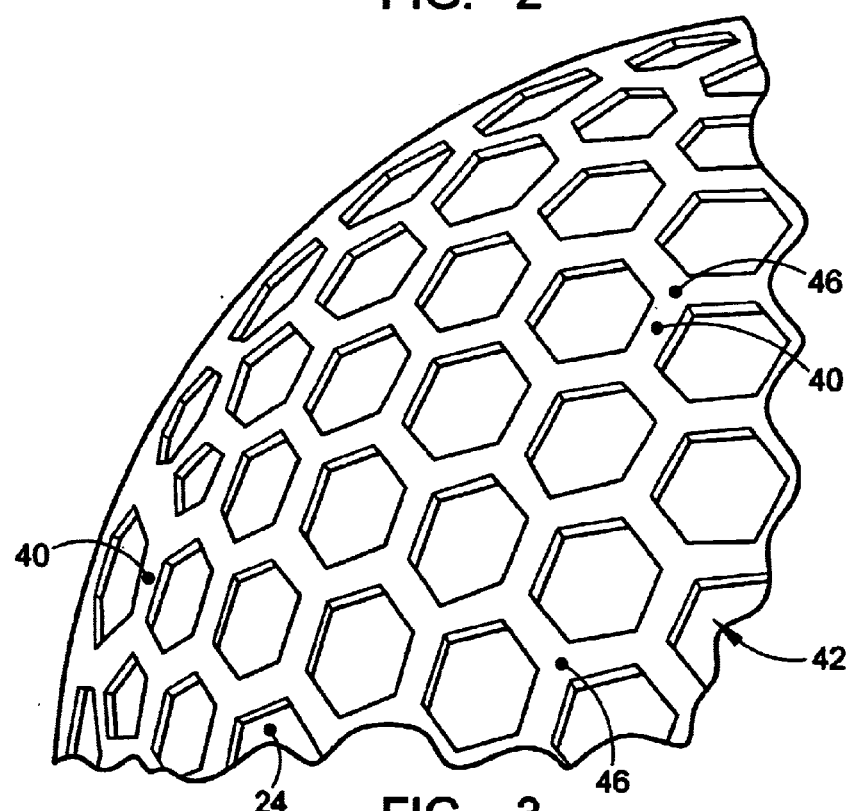
FIG. 3 is an enlargement of a section of FIG. 1.

As shown in FIGS. 1 and 1A, the golf ball of the present invention is generally designated 20. The golf ball 20 has a core 12 and a cover 14 encompassing the core. The surface of the golf ball 20 has a lattice structure aerodynamic pattern.

The golf ball 20 has innersphere 21 with an innersphere surface 22. The golf ball 20 also has an equator 24 dividing the golf ball 20 into a first hemisphere 26 and a second hemisphere 28. A first pole 30 is located ninety degrees along a longitudinal arc from the equator 24 in the first hemisphere 26. A second pole 32 is located ninety degrees along a longitudinal arc from the equator 24 in the second hemisphere 28.

Descending toward the surface 22 of the innersphere 21 are a plurality of lattice members 40. In a preferred embodiment, the lattice members 40 are tubular. However, those skilled in the pertinent art will recognize that the lattice members 40 may have other similar shapes. The lattice members 40 are connected to each other to form a lattice structure 42 on the golf ball 20. The interconnected lattice members 40 form a plurality of polygons encompassing discrete areas of the surface 22 of the innersphere 21. Most of these discrete bounded areas 44 are hexagonal shaped bounded areas 44a, with a few pentagonal shaped bounded areas 44b, a few octagonal shaped bounded areas 44c, and a few quadragonal shaped bounded areas 44d. In the embodiment of FIGS. 1–4, there are 380 polygons. In an alternative embodiment, there are 332 polygons.

In the preferred embodiment, each of the plurality of lattice members 40 is connected to at least another lattice members 40. Each of the lattice members 40 meet at least two other lattice members 40 at a vertex 46. Most of the vertices 46 are the congruence of three lattice members 40. However, some vertices 46a are the congruence of four lattice members 40. These vertices 46a are located at the equator 24 of the golf ball 20. The length of each of the lattice members 40 ranges from 0.005 inch to 0.01 inch thereby defining an outersphere of at least 1.68 inches.

The preferred embodiment of the present invention has reduced the land to almost zero since only a line of each of the plurality of lattice members 40 is in a spherical plane at 1.68 inches, the outersphere. More specifically, the land area of traditional golf balls is the area forming a sphere of at least 1.68 inches for USGA and R&A conforming golf balls. This land area is traditionally minimized with dimples that are concave into the surface of the sphere of the traditional golf ball, resulting in land area on the non-dimpled surface of the golf ball. However, the golf ball 20 of the present invention has only a line at an apex 50 of each of the lattice members 40 that defines the land area of the outersphere of the golf ball 20.

Traditional golf balls were designed to have the dimples trip the boundary layer on the surface of a golf ball in flight to create a turbulent flow for greater lift and reduced drag. The golf ball 20 of the present invention has the lattice structure 42 to trip the boundary layer of air about the surface of the golf ball 20 in flight.

Figure 4:
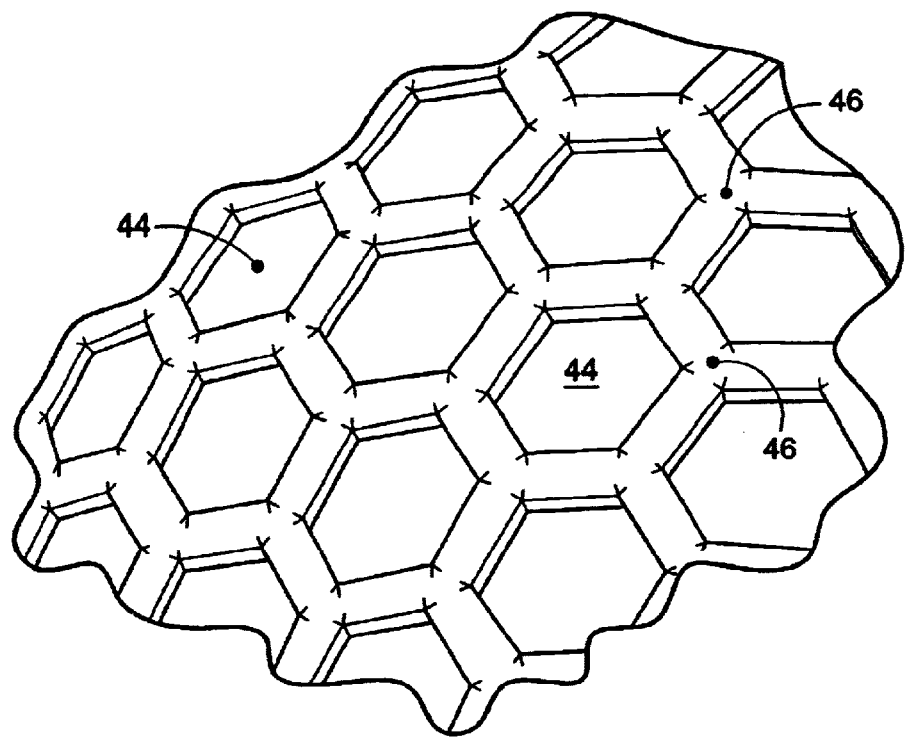
FIG. 4 is an enlargement of a section of FIG. 3
Figure 4A:
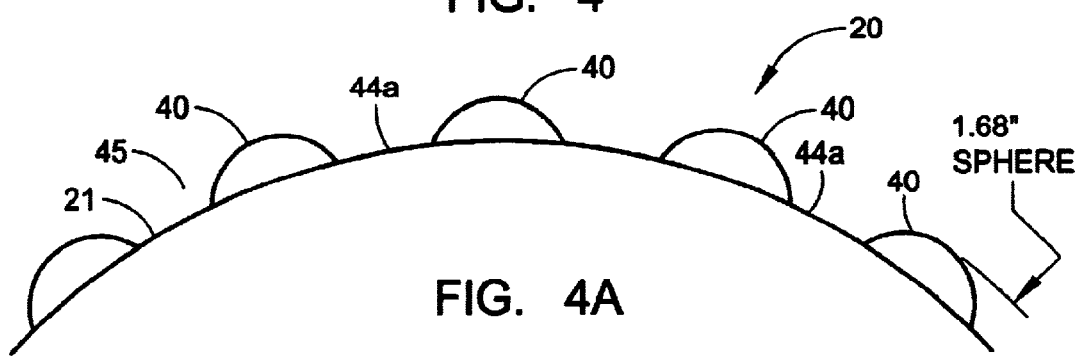
FIG. 4A is a cross-sectional view of the surface of the golf ball of the present invention illustrating an outersphere, also referred to as a phantom sphere.

As shown in FIG. 4A, a 1.68 inches outersphere, as shown by dashed line 45, encompasses the lattice members 40 and the innersphere 21. The volume of the lattice structure 42 as measured from the bottom of each lattice member 40 to the apex 50 is a minimal amount of the volume between the 1.68 inches outersphere and the innersphere 21. In the preferred embodiment, the apex 50 lies on the 1.68 inches outersphere. Thus, over 90 percent, and closer to 95 percent, of the entire volume of the golf ball 20 lies below the 1.68 inches outersphere.

Figure 5:
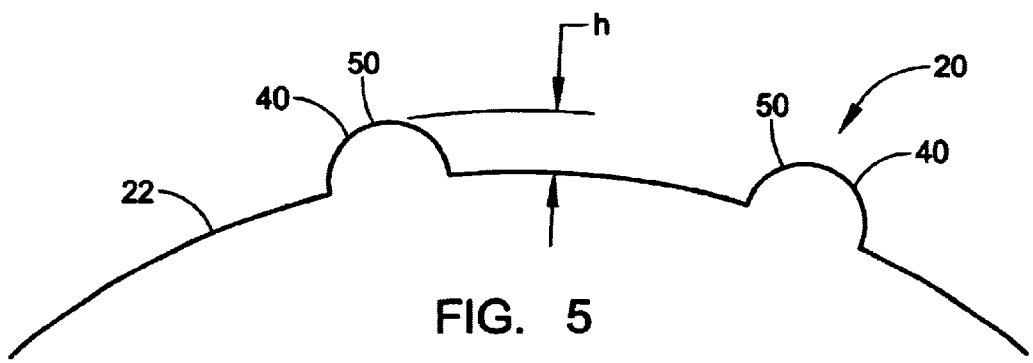
FIG. 5 is a cross-sectional view of one embodiment of lattice members of the golf ball of the present invention.
Figure 6:
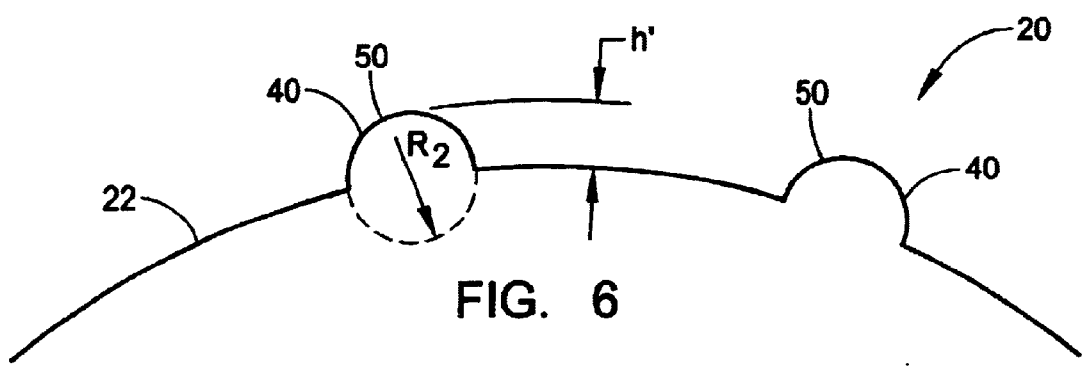
FIG. 6 is a cross-sectional view of an alternative embodiment of lattice members of the golf ball of the present invention.
Figure 6A:
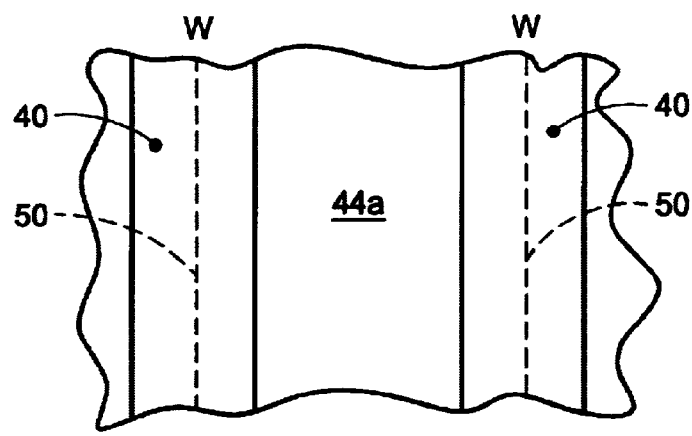
FIG. 6A is a top plan view of FIG. 6 to illustrate the width of the apex of each of the lattice members.

As shown in FIGS. 5 and 6, the distance h and h' of the lattice members 40 from the bottom of each lattice member 40 to an apex 50 will vary in order to have the golf ball 20 meet or exceed the 1.68 inches requirement. For example, if the diameter of the innersphere 21 is 1.666 inches, then the distance h of the lattice members 40 in FIG. 5 is 0.007 inch since the lattice member 40 on one hemisphere 26 is combined with a corresponding lattice member 40 on the second hemisphere 28 to reach the 1.68 inches requirement. In a preferred embodiment, if lattice members 40 having a greater distance h' are desired, such as in FIG. 6, then the innersphere 21 has a lesser diameter. Thus, the diameter of the innersphere 21 in FIG. 6 is 1.662 while the distance h' of the lattice members 40 are 0.009 inch thereby resulting in an outersphere with a diameter of 1.68 inches. As shown in FIG. 6A, the width of each of the apices 50 is minimal since the apex lies along an arc of a lattice member 40. In theory, the width of each apex 50 should approach the width of a line. In practice, the width of each apex 50 of each lattice member 40 is determined by the precision of the mold utilized to produce the golf ball 20. The precision of the mold is itself determined by the master used to form the mold. In the practice, the width of each line ranges from 0.0001 inch to 0.001 inch.

Figure 7:
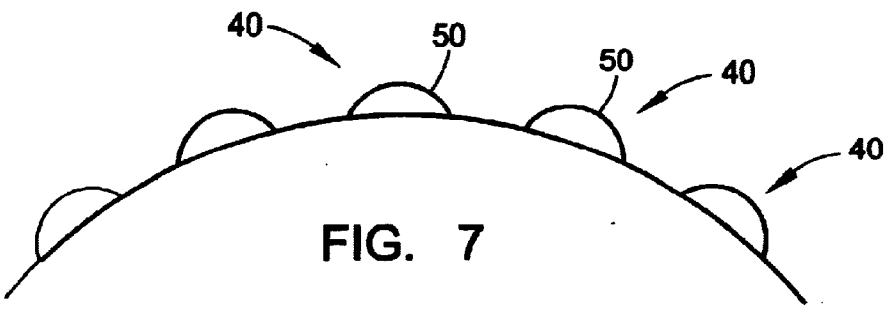
FIG. 7 is an isolated cross-sectional view of one embodiment of lattice members of the golf ball of the present invention.
Figure 8:
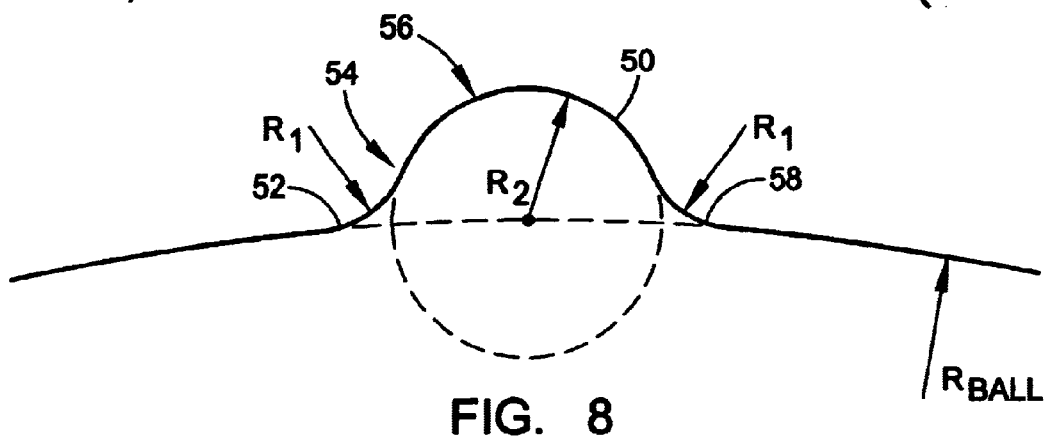
FIG. 8 is a cross-sectional view of a preferred embodiment of lattice members of the golf ball of the present invention.

Although the cross-section of the lattice members 40 shown in FIGS. 5 and 6 are circular, a preferred cross-section of each of the plurality of lattice members 40 is shown in FIGS. 7 and 8. In such a preferred cross-section, the lattice member 40 has a contour 52 that has a first concave section 54, a convex section 56 and a second concave section 58. The radius $R_2$ of the convex portion 56 of each of the lattice members 40 is preferably in the range of 0.0275 inch to 0.0350 inch. The radius $R_1$ of the first and second concave portions 54 and 58 is preferably in the range of 0.150 inch to 0.200 inch, and most preferably 0.175 inch. $R_{IS}$ is the radius of the innersphere, which is preferably 0.831 inch. $R_{OS}$ is the radius of the outersphere, which is preferably 1.68 inches.

A preferred embodiment of the present invention is illustrated in FIGS. 9, 9A, 9B and 9C. In this embodiment, the golf ball 20 has a parting line 100 that corresponds to the shape of polygon defined by the plurality of lattice members 40 about the equator 24. Thus, if the polygons have a hexagonal shape, the parting line 100 will alternate along the lower half of one hexagon and the upper half of an adjacent hexagon. In the embodiment of FIGS. 9, 9A, 9B and 9C, there are 332 polygons, with 12 of those polygons being pentagons and the rest being hexagons.

Figure 9:
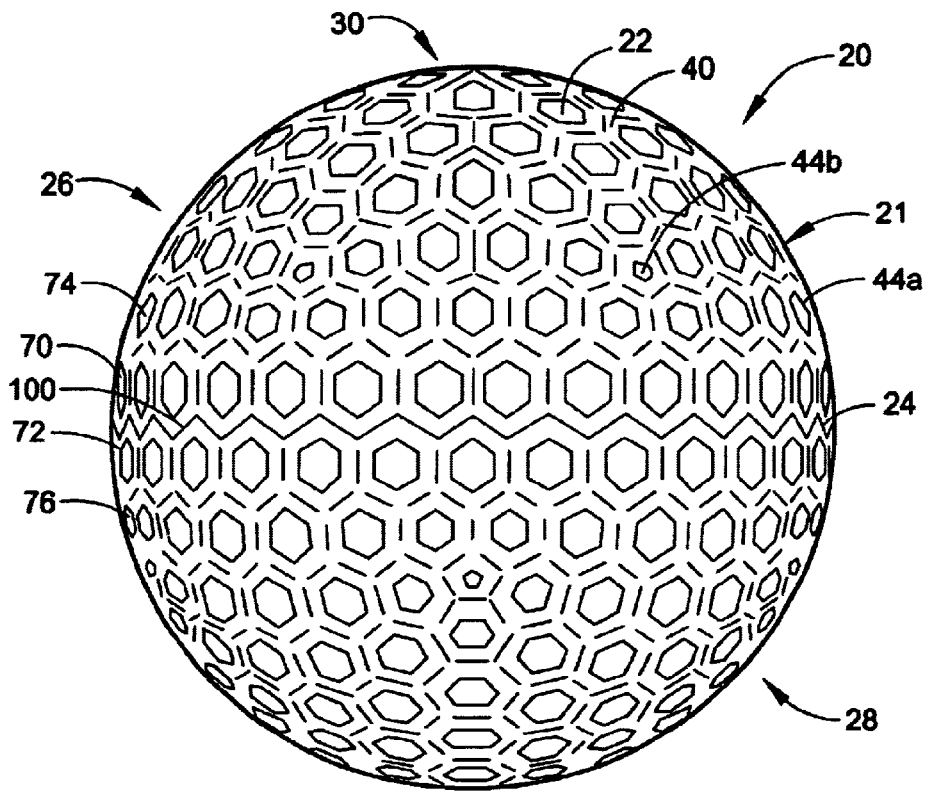
FIG. 9 is a front view of the preferred embodiment of the golf ball of the present invention illustrating the alternating parting line.
Figure 9A:
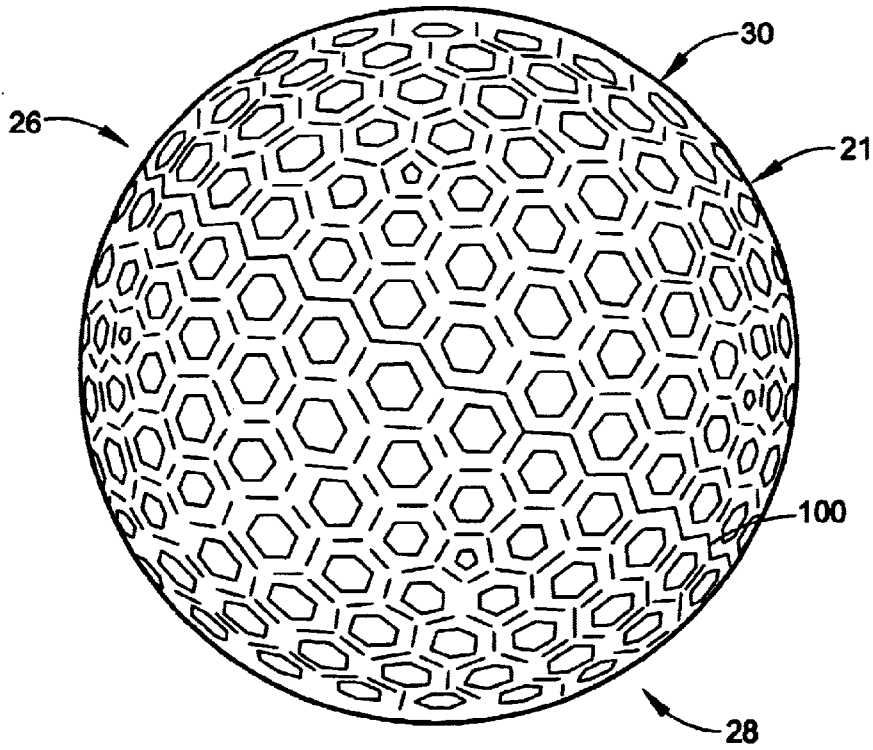
FIG. 9A is a perspective view of the golf ball of FIG. 9.
Figure 9B:
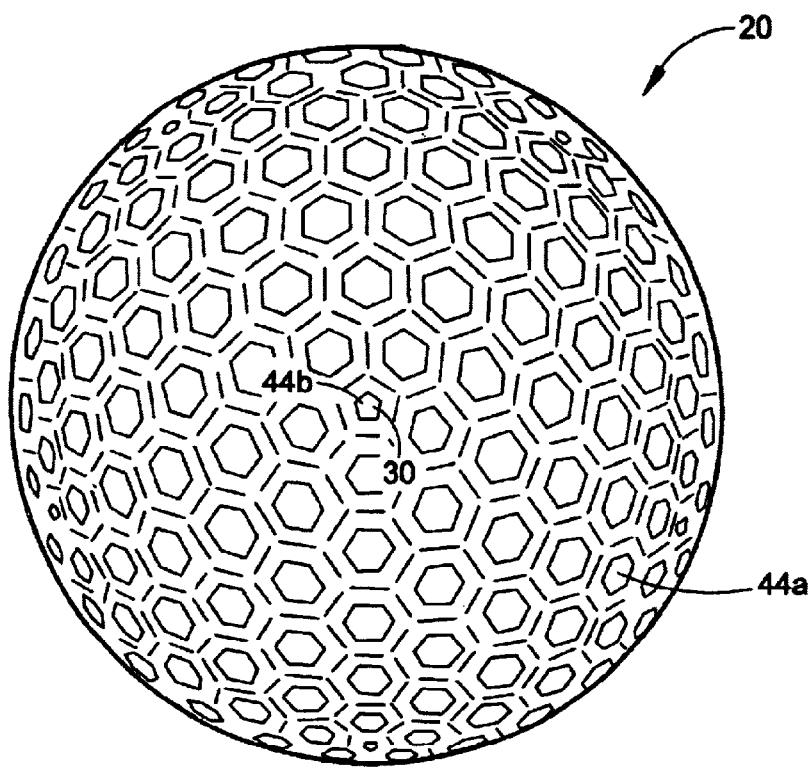
FIG. 9B is a polar view of the golf ball of FIG. 9.
Figure 9C:
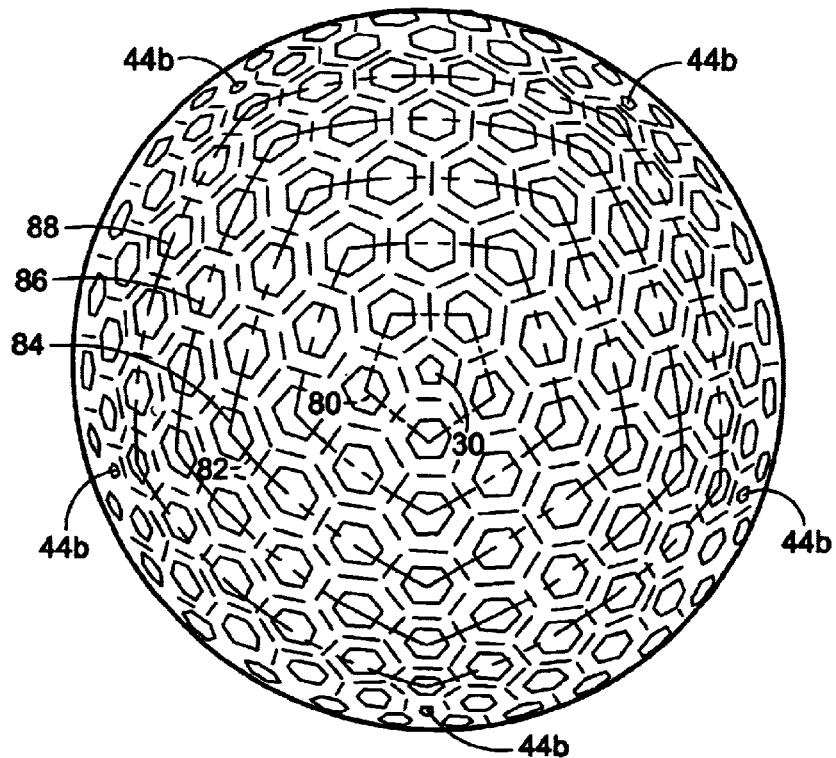
FIG. 9C is an identical view of FIG. 9 illustrating the pentagonal grouping of hexagons.

As shown in FIG. 9, each hemisphere 26 and 28 has two rows of hexagons 70, 72, 74 and 76, adjacent the parting line 100. The pole 30 of the first hemisphere 26 is encompassed by a pentagon 44b, as shown in FIG. 9B. The pentagon 44b at the pole 30 is encompassed by ever increasing spherical pentagonal groups of hexagons 80, 82, 84, 86, and 88. A pentagonal group 90 has pentagons 44b at each respective base, with hexagons 44a therebetween. The pentagonal groups 80, 82, 84, 86, 88 and 90 transform into the four adjacent rows 70, 72, 74 and 76. The preferred embodiment only has hexagons 44a and pentagons 44b.

Figure 10:
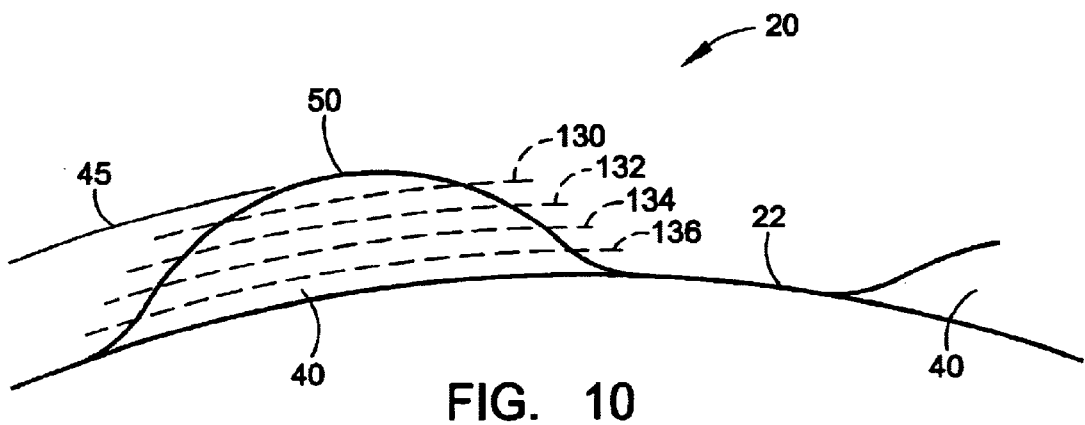
FIG. 10 is an enlarged view of the surface of a golf ball of the present invention to demonstrate the minimal volume feature of the present invention.

FIG. 10 is an enlarged view of the surface of the golf ball 20 of the present invention to demonstrate the minimal volume of the golf ball 20 from a predetermined distance from the greatest extent of the golf ball 20, the outersphere. More specifically, the greatest extent of one embodiment of the golf ball 20 are the apices 50 of the lattice members 40 which lie on a spherical plane (shown as dashed line 45) which has a 1.682 inches diameter, the outersphere. Those skilled in the art should recognize that other embodiments could have the apices 50 lie on a spherical plane at 1.70 inches, 1.72 inches, 1.64 inches, 1.60 inches, or any other variation in the diameter of the greatest extent of the golf ball 20. Having defined the greatest extent of the golf ball 20, the present invention will have a minimal volume from this greatest extent toward the innersphere 22. For example, dashed line 130 represents a spherical plane that intersects each of the lattice members 40 at a distance of 0.002 inch (at a radius of 0.839 inch from the center) from the greatest extent of the golf ball 20. The volume of the golf ball 20 of the present invention between the greatest extent spherical plane 45 and the spherical plane 130 is only 0.0008134 cubic inch. In other words, the outermost 0.002 inch (between a radius of 0.841 and 0.839 inch) of the golf ball 20 has a volume 0.0008134 cubic inch.

Figure 11:
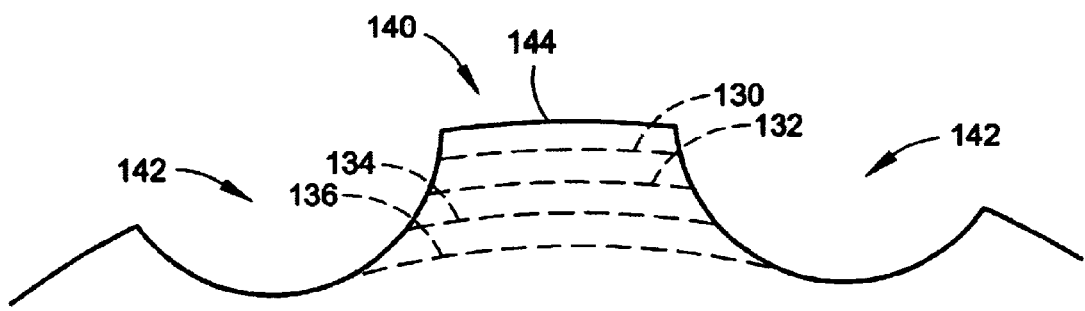
FIG. 11 is an enlarged view of the surface of a golf ball of the prior art for comparison to the minimal volume feature of the present invention.

FIG. 11 illustrates the surface of a golf ball 140 of the prior art, which has traditional dimples 142 encompassed by a land area 144. The land area 144 represents the greatest extent of the golf ball 140 of the prior art. For comparison to the golf ball 20 of the present invention, the volume of the golf ball 140 of the prior art between the greatest extent 144 and a spherical plane 130' is 0.00213 cubic inch. Spherical planes 132, 134 and 136, at 0.004 inch, 0.006 inch and 0.008 inch respectively, have volumes of 0.0023074 cubic inch, 0.0042164 cubic inch and 0.0065404 cubic inch, respectively on the golf ball 20 of the present invention. Spherical planes 132', 134' and 136', at 0.004 inch, 0.006 inch and 0.008 inch respectively, will have volumes of 0.00498 cubic inch, 0.00841 cubic inch and 0.01238 cubic inch on the golf ball 140 of the prior art 140.

Figure 12:
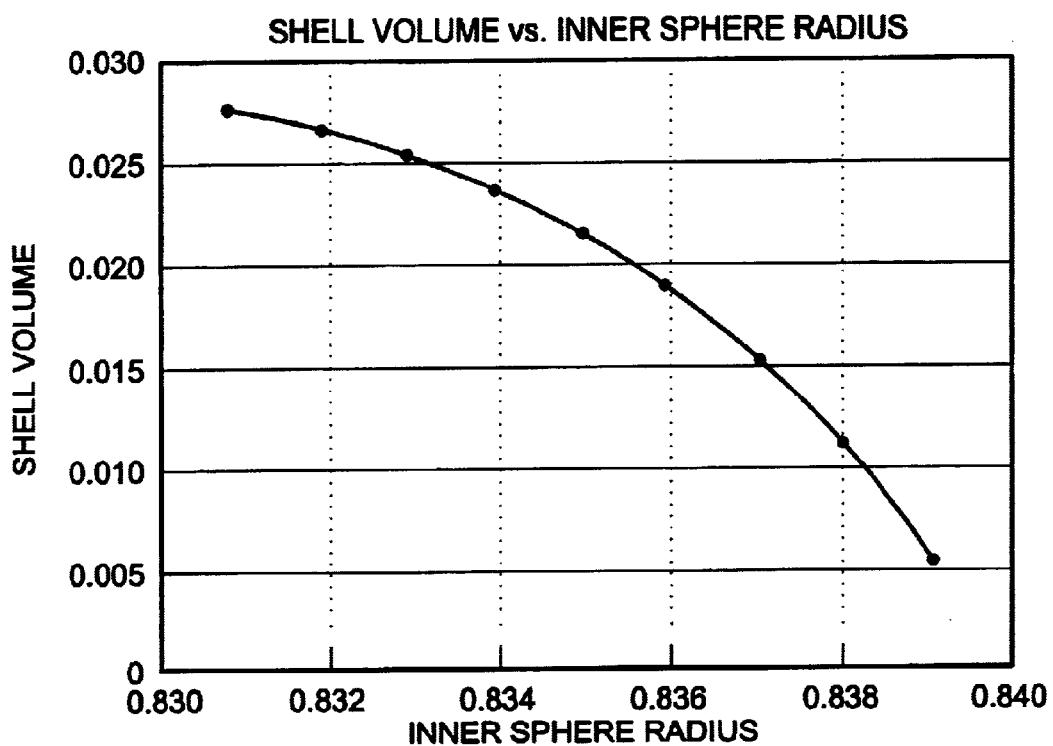
FIG. 12 is a chart of the minimal volume.

Thus, as further shown in FIG. 12 and Table One below, the golf ball 20 of the present invention preferably has a minimal volume at a predetermined distance from the greatest extent of the golf ball 20. This minimal volume is a minimal amount necessary to trip the boundary layer air at low speed while providing a low drag level at high speeds. The first column of Table One is the distance from the outermost point of the golf ball 20, which is the apex 50 of each of the lattice members 40. The second column is the individual volume of each of the 830 lattice members 40 at this distance inward from the outermost point. The third column is the total volume of the spherical planes at each distance inward from the outermost point. Table Two contains similar information for the golf ball 140 of the prior art.

TABLE ONE

| Tube H | Tube Vol | Total Volume |
|---|---|---|
| 0.001 | 0.00000035 | 0.0002905 |
| 0.002 | 0.00000098 | 0.0008134 |
| 0.003 | 0.00000181 | 0.0015023 |
| 0.004 | 0.00000278 | 0.0023074 |
| 0.005 | 0.00000387 | 0.0032121 |
| 0.006 | 0.00000508 | 0.0042164 |
| 0.007 | 0.00000641 | 0.0053203 |
| 0.008 | 0.00000788 | 0.0065404 |
| 0.009 | 0.00001123 | 0.0093209 |

TABLE TWO

| Shell Delta Dia. | 1/10 Remaining Vol | Total Remaining Vol |
|---|---|---|
| 0.001 | 0.000091 | 0.00091 |
| 0.002 | 0.000213 | 0.00213 |
| 0.003 | 0.000347 | 0.00347 |
| 0.004 | 0.000498 | 0.00498 |
| 0.005 | 0.000663 | 0.00663 |
| 0.006 | 0.000841 | 0.00841 |
| 0.007 | 0.001033 | 0.01033 |
| 0.008 | 0.001238 | 0.01238 |
| 0.009 | 0.001458 | 0.01458 |

The aerodynamic pattern of the golf ball 20 is combined with a two-piece golf ball construction that has a relatively soft hardness cover 14 encompassing the core 12 with a relatively soft core compression. The construction of the golf ball 20 allows for a golf ball 20 that has a softer cover while providing greater velocity and better spin than other competitive golf balls.

The coefficient of restitution (COR) is a measure of the resilience of a golf ball. The COR is a measure of the ratio of the relative velocity of the golf ball after direct impact with a hard surface to the relative velocity before impact with the hard surface. The COR may vary from 0 to 1, with 1 equivalent to a completely elastic collision and 0 equivalent to a completely inelastic collision. A golf ball having a COR value closer to 1 will generally correspond to a golf ball having a higher initial velocity and a greater overall distance. The force of a club during a swing is transferred to a golf ball. If the golf ball has a high COR (more elastic), then the initial velocity of the golf ball will be greater than if the golf ball had a low COR. In general, a higher compression core will result in a higher COR value. The COR of the core 12 of the golf ball 20 of the present invention is preferably 75 to 80 points at 143 feet per second (fps), most preferably ranging from 78.0 to 79.5 points at 143 fps,), even more preferably ranging from 78.5 to 79.4 points at 143 fps, and is most preferably 79.0 points at 143 fps.

In the present invention, the core components are mixed and compression molded in a conventional manner known to those skilled in the art. In a preferred form, the finished core 12 has a diameter of about 1.50 inch to about 1.62 inch for a golf ball 20 having an outer diameter of 1.68 inches, and is most preferably 1.535 to 1.545, with 1.54 the preferable diameter of the core 12. The core weight is preferably maintained in the range of about 32 to about 40 g, with 34 grams to 38 grams a more preferably range and 37 grams the most preferable weight of the core 12. The core PGA compression is preferably maintained in the range of about 60 to 80, and most preferably range about 65 to 75 with 70 the most preferable core compression.

As used herein, the term PGA compression is defined as follows: PGA compression value=180 Riehle compression value The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85.

The core 12 of the golf ball 20 is generally composed of a blend of a base rubber, a cross-linking agent, a free radical initiator, tungsten and one or more fillers or processing aids. A preferred base rubber is a polybutadiene having a cis-1,4 content above 90%, and more preferably 98% or above.

The use of cross-linking agents in a golf ball core is well known, and metal acrylate salts are examples of such cross-linking agents. For example, metal salt diacrylates, dimethacrylates, or mono(meth)acrylates are preferred for use in the golf ball cores of the present invention, and zinc diacrylate is a particularly preferred cross-linking agent. A commercially available suitable zinc diacrylate is SR-416 available from Sartomer Co., Inc., Exton, Pa. Other metal salt di- or mono-(meth)acrylates suitable for use in the present invention include those in which the metal is calcium or magnesium. In the manufacturing process it may be beneficial to pre-mix some cross-linking agent(s), such as, e.g., zinc diacrylate, with the polybutadiene in a master batch prior to blending with other core components. A preferred mixing process is disclosed in co-pending U.S. patent application Ser. No. 09/690,373 filed on Oct. 16, 2000, entitled A Process For Manufacturing A Core For A Golf Ball, which pertinent parts are hereby incorporated by reference.

Free radical initiators are used to promote cross-linking of the base rubber and the cross-linking agent. Suitable free radical initiators for use in the golf ball core 12 of the present invention include peroxides such as dicumyl peroxide, bis-(t-butyl peroxy) diisopropyl benzene, t-butyl perbenzoate, di-t-butyl peroxide, 2,5-dimethyl-2,5-di-5-butylperoxyhexane, 1,1-di (t-butylperoxy) 3,3,5-trimethyl cyclohexane, and the like, all of which are readily commercially available.

Zinc oxide is also preferably included in the core formulation. Zinc oxide may primarily be used as a weight adjusting filler, and is also believed to participate in the cross-linking of the other components of the core (e.g. as a coagent). Additional processing aids such as dispersants and activators may optionally be included. In particular, zinc stearate may be added as a processing aid (e.g. as an activator).

Tungsten is added to the core mixture to provide weight to the core 12, and the golf ball 20, while occupying volume minimal volume. Tungsten has a density of 19.3 grams per centimeter cubed, which is much greater than the density of the polybutadiene. Thus, minimal tungsten allows for the necessary weight while allowing for more polybutadiene to be used in the core 12 to provide greater velocity. A number of other specific gravity adjusting fillers, in addition to the tungsten, may be included to obtain a preferred total weight of the core 12. Examples of such fillers include clay and barium sulfate. All such processing aids and fillers are readily commercially available. The present inventors have found a particularly useful tungsten filler is WP102 Tungsten (having a 3 micron particle size) available from Atlantic Equipment Engineers, Bergenfield, N.J.

Table Three below provides the ranges of materials included in the preferred core formulations of the present invention.

TABLE THREE

| Component | Preferred Range | Most Preferred Range |
|---|---|---|
| Polybutadiene | 100 parts | 100 parts |
| Zinc diacrylate | 20–35 phr | 25–30 phr |
| Zinc oxide | 0–50 phr | 5–15 phr |
| Zinc stearate | 0–15 phr | 1–7 phr |
| Peroxide | 0.2–2.5 phr | 0.5–1.5 phr |
| Filler | As desired | As desired |
| Tungsten | 6–10 phr | 6 phr |

The preferred specific gravity for the core 12 is 1.165 to 1.185, and most preferably 1.174.

The cover 14 preferably is composed of a thermoplastic material (e.g. thermoplastic or thermoplastic elastomer) or a blend of thermoplastic material (e.g. metal containing, non-metal containing or both). Most preferably the cover 14 is composed of a blend of thermoplastic materials that contain organic chain molecules and metal ions. The metal ion may be, for example, sodium, zinc, magnesium, lithium, potassium, cesium, or any polar metal ion that serves as a reversible cross-linking site and results in high levels of resilience and impact resistance. Suitable commercially available thermoplastics are ionomers based on ethylene copolymers and containing carboxylic acid groups with metal ions such as described above. The acid levels in such suitable ionomers may be neutralized to control resiliency, impact resistance and other like properties.

In addition, other fillers with ionomer carriers may be used to modify (e.g. preferably increase) the specific gravity of the thermoplastic blend to control the moment of inertia and other like properties. Exemplary commercially available thermoplastic materials suitable for use in a cover 14 of a golf ball 20 of the present invention include, for example, the following materials and/or blends of the following materials: HYTREL® and/or HYLENE® products from DuPont, Wilmington, Del., PEBAX® products from Elf Atochem, Philadelphia, Pa., SURLYN® products from DuPont, and/or ESCOR® or IOTEK® products from Exxon Chemical, Houston, Tex.

The Shore D hardness of the cover 14 should be about 58 or less. It is preferred that the cover 14 have a hardness of between about 52–58 Shore D, more preferably from 54 to 56, and most preferably 55. One reason for preferring a cover 14 with a Shore D hardness of 52 to 58 is to improve the feel of the resultant golf ball. The Shore D Hardness is determined according to ASTM D2240. However, the comparative testing in Table Two tested the Shore D hardness on the lattice structure of an actual golf ball by using an INSTRON Shore D durometer tester while the golf ball was fixed within a holder.

It is also preferred that the cover 14 is composed of a blend of SURLYN® ionomer resins. SURLYN® 8150 and 6320 are, respectively, an ionomer resin composed of a sodium neutralized ethylene/methacrylic acid, and an ionomer resin composed of a terpolymer of ethylene, methacrylic acid and n-butyl acrylate partially neutralized with magnesium, all of which are available from DuPont, Polymer Products, Wilmington, Del.

Preferably the blend of ionomers that form the cover 14 is composed of 20 to 40 weight percent of a sodium neutralized ethylene/methacrylic acid ionomer resin (SURLYN 8150), and 60 to 80 weight percent of an ionomer resin composed of a terpolymer of ethylene, methacrylic acid and n-butyl acrylate partially neutralized with magnesium (SURLYN 6320). A preferred embodiment is a blend of ionomers composed of 35 weight percent of a sodium neutralized ethylene/methacrylic acid ionomer resin (SURLYN 8150), and 65 weight percent of an ionomer resin composed of a terpolymer of ethylene, methacrylic acid and n-butyl acrylate partially neutralized with magnesium (SURLYN 6320).

Preferably, the ionomer resins are mixed and heated, then injection molded in a flowable form over the core 12 in a conventional manner that is well-known to those skilled in the pertinent art to form the cover 14. The mold has an inverse aerodynamic pattern to form the aerodynamic pattern on the cover 14. Alternatively, the cover 14 may be manufactured using half shells that are compression molded over the core 12, which is also well-known in the pertinent art.

An alternative embodiment of the cover 14 may include a predetermined amount of a baryte mixture. The baryte mixture is included as 8 or 9 parts per hundred parts of the ionomer resins. One preferred baryte mixture is composed of 80% barytes and 20% of an ionomer, and is available from Americhem, Inc., Cuyahoga Falls, Ohio, under the trade designation 38534X1.

The cover 14 preferably has a thickness of 0.060 inch to 0.090 inch, most preferably ranging from 0.065 inch to 0.080 inch, and most preferably 0.070 inch.

The golf ball 20 is preferably finished by applying a base coat and/or top coat to the surface of the cover 14 for whiteness and protection. Also, a logo marking may be applied to the base coat or top coat. The finished golf ball 20 preferably has a weight of 45 to 46 grams, preferably 45.65 grams. The golf ball 20 preferably has a PGA compression of 70 to 95 points, more preferably 80 to 90 points, and most preferably 84 points. The golf ball 20 has a COR of 75 to 85 points, preferably 78.0 to 79.5 points, and most preferably 79.0 points at 143 fps. The golf ball 20 preferably has a diameter of approximately 1.68 inches. However, those skilled in the pertinent art will recognize that the golf ball may have a diameter that is more of less than 1.68 inches without departing from the scope and spirit of the present invention.

Table Four is a comparison of the golf ball 20 of the present invention and other competitive golf balls on the market.

TABLE FOUR

| Ball | Core Compression | Ball COR | Ball Rebound | Cover Hardness | Ball Compression | True Spin Sand Wedge | Medium Speed Driver Ball velocity |
|---|---|---|---|---|---|---|---|
| Golf ball 20 | 70.75 | 0.7896 | 74.8 | 55 | 84 | 5229 | 132.43 |
| Precept MC Spin | 80.66 | 0.7803 | 74.3 | 50 | 88 | 6190 | 132.11 |

TABLE FOUR-continued

| Ball | Core Compression | Ball COR | Ball Rebound | Cover Hardness | Ball Compression | True Spin Sand Wedge | Medium Speed Driver Ball velocity |
|---|---|---|---|---|---|---|---|
| Precept EV Extra Spin | 85.54 | 0.7739 | 74.65 | 55.25 | 103 | 4535 | 131.95 |
| Titleist HP Tour | 71.70 | 0.7653 | 77.4 | 60 | 86 | 4391 | 131.16 |
| Wilson Staff Smart-Core Spin Distance | 50.37 | 0.7658 | 73.36 | 61 | 87 | 4011 | 130.94 |
| Nike Spin Control | 66.04 | 0.7765 | 74.86 | 53 | 83 | 5330 | 131.58 |
| Maxfli XS Tour | 82.03 | 0.7790 | 73.76 | 55 | 95 | 5430 | 132.02 |
| Top Flite XL2000 Exceptional Spin | 71.17 | 0.7616 | 74.8 | 60 | 93 | 4239 | 130.72 |

The ball compression for each golf ball in Table Four was measured using the PGA compression test described above for several golf balls and taking the mean value. The core compression for each golf ball in Table Four was measured by removing the cover and subjecting the core of each golf ball to a PGA compression test as described above for several golf balls and taking the mean value. The Ball COR for each golf ball in Table Four was measured by firing each golf ball at 143 fps at a solid wall as described above for several golf balls and taking the mean value. The cover hardness for each golf ball in Table Four was measured on the golf ball using a Shore D durometer as described above for several golf balls and taking the mean value. The ball rebound for each golf ball in Table Four was measured by dropping each golf ball at a predetermined height at a solid floor as measuring the rebound for several golf balls and taking the mean value. The sand wedge true spin for each golf ball in Table Four was determined by hitting each golf ball with a Callaway Golf® STEELHEAD™ X-14® sand wedge at a speed of approximately 50 miles per hour (MPH) for several golf balls and taking the mean value of the spin in rotations per minute. The medium speed driver ball velocity for each golf ball in Table Four was determined by hitting each golf ball with a Callaway Golf® BIG BERTHA® HAWK EYE® VFT™ ten degree driver at a speed of approximately 90 miles per hour (MPH) for several golf balls and taking the mean value.

Figure 13:
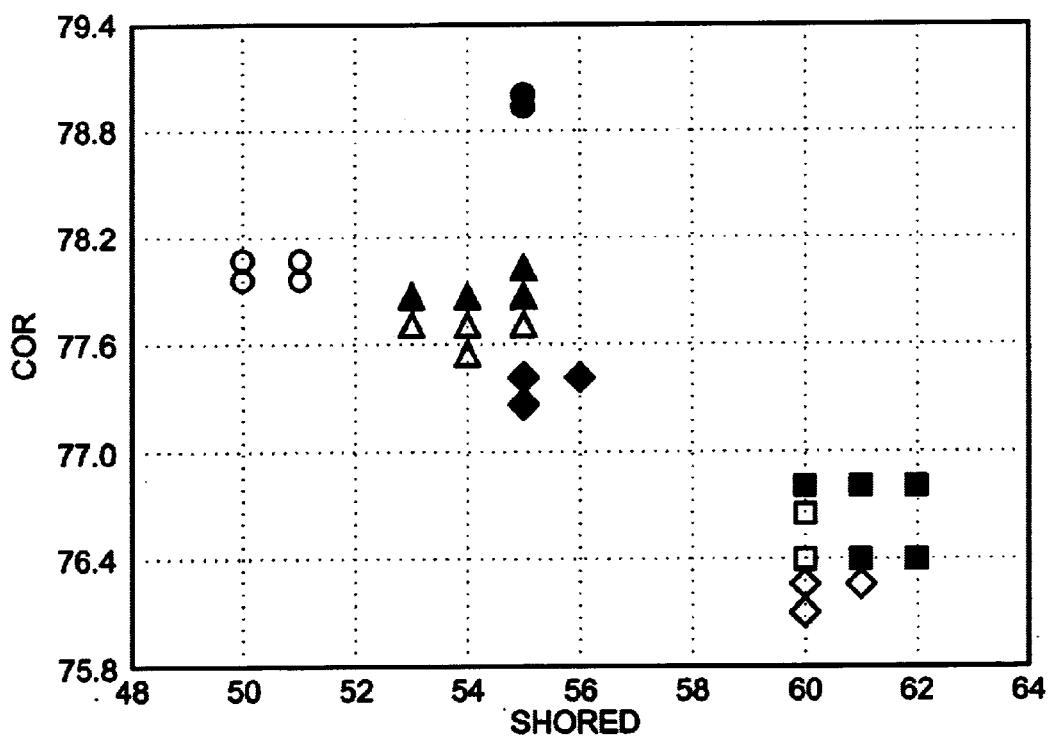
FIG. 13 is a graph of the Coefficient of Restitution (COR) for a golf ball (y-axis) and the Shore D of the cover (x-axis) for the golf ball of the present invention and 12 competitor golf balls.

As shown in FIG. 13, the golf ball 20 of the present invention is the only golf ball that has a COR greater than 78.2 (or 0.782 unscaled) and a Shore D less 56. More specifically, the golf ball 20 of the present invention is the only golf ball that has a COR greater than 78.8 and a Shore D less 56. Most specifically, the golf ball 20 of the present invention is the only golf ball that has a COR greater than 79.0 and a Shore D less 56.

Figure 14:
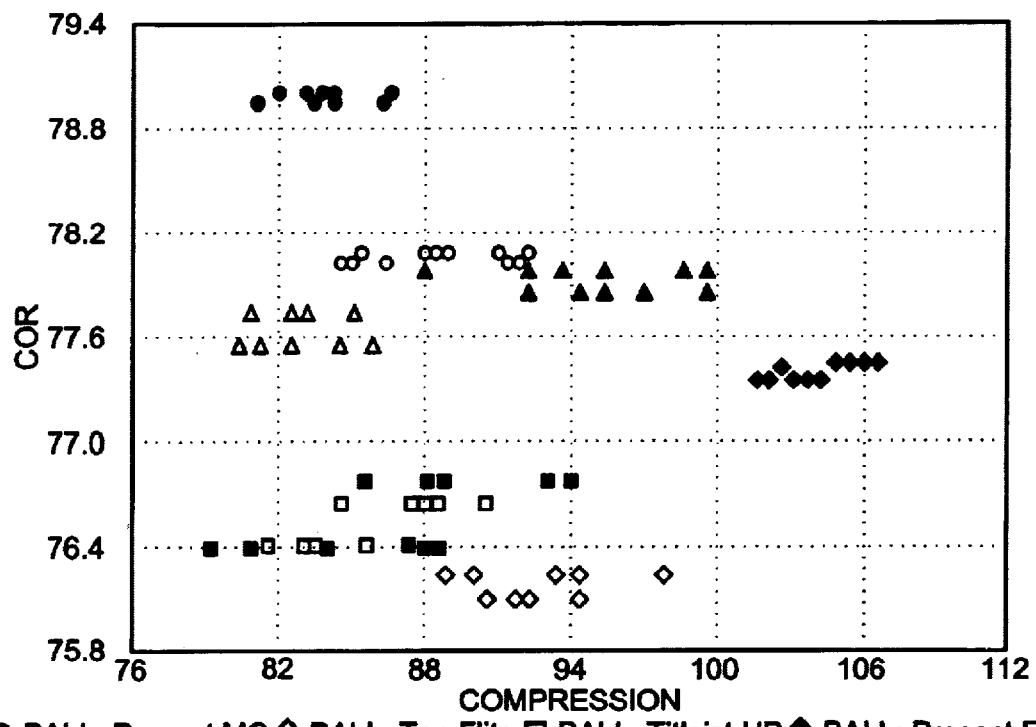
FIG. 14 is a graph of the Coefficient of Restitution (COR) for a golf ball (y-axis) and the ball compression (x-axis) for the golf ball of the present invention and 12 competitor golf balls.

As shown in FIG. 14, the golf ball 20 of the present invention is the only golf ball that has a COR greater than 78.2 and a ball compression less than 88 points. More specifically, the golf ball 20 of the present invention is the only golf ball that has a COR greater than 78.8 and a ball compression less than 88 points. Most specifically, the golf ball 20 of the present invention is the only golf ball that has a COR greater than 79.0 and a ball compression less than 88 points.

Figure 15:
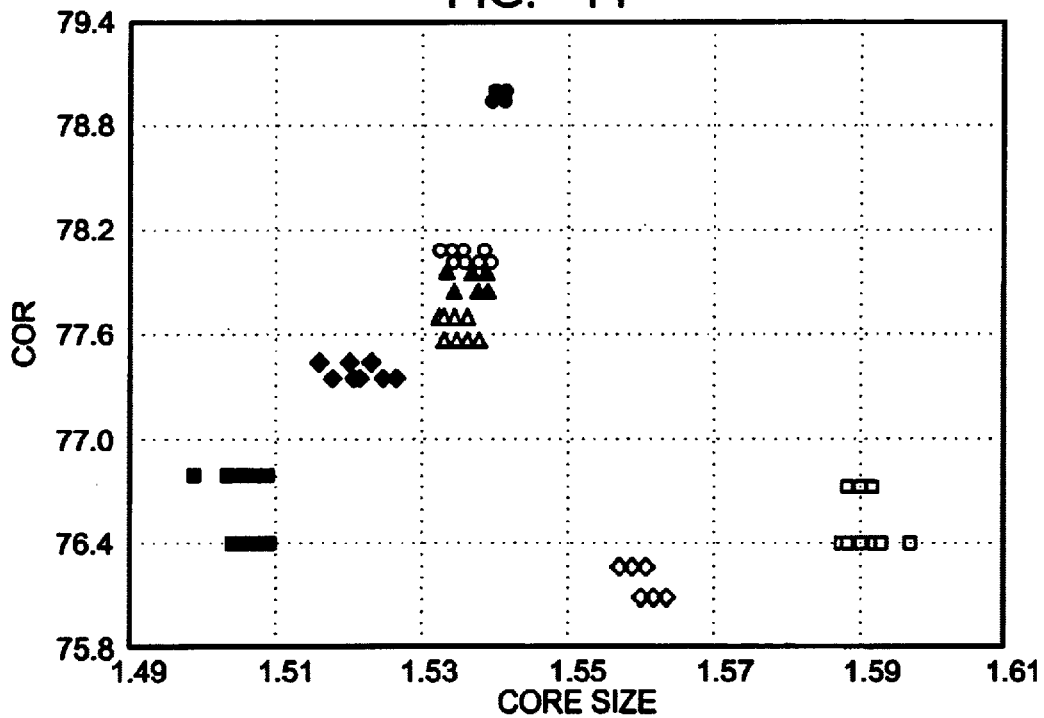
FIG. 15 is a graph of the Coefficient of Restitution (COR) for a golf ball (y-axis) and the core size (x-axis) for the golf ball of the present invention and 12 competitor golf balls.

As shown in FIG. 15, the golf ball 20 of the present invention is the only golf ball that has a COR greater than 78.2 and a core size between 1.53 inches and 1.55 inches. More specifically, the golf ball 20 of the present invention is the only golf ball that has a COR greater than 78.8 and a core size between 1.53 inches and 1.55 inches. Most specifically, the golf ball 10 of the present invention is the only golf ball that has a COR greater than 79.0 and a core size between 1.53 inches and 1.55 inches.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf comprising:
   a core having a diameter of 1.50 inches to 1.56 inches, the core comprising polybutadiene, zinc oxide in an amount of 7 to 15 part per hundred parts of polybutadiene, zinc diacrylate in an amount of 20 to 50 parts per hundred parts of polybutadiene; an initiator in an amount of 0.1 to 1.0 parts per hundred parts of polybutadiene, and tungsten in an amount of 5 to 10 parts per hundred parts of polybutadiene, the core having a PGA compression of 60 to 80 points; and
   a cover having a thickness of 0.060 inch to 0.090 inch, the cover comprising a thermoplastic material, and a Shore D hardness ranging from 52 to 58 as measured on the golf ball;
   wherein the golf ball has a PGA compression ranging from 80 to 95 points and a COR at 143 feet per second of 78.2 to 80.5, and the golf ball has a lattice structure aerodynamic pattern.

2. A golf ball comprising:
   a core having a diameter of 1.50 inches to 1.56 inches, the core having a PGA compression of 60 to 80 points; and
   a cover having a thickness of 0.060 inch to 0.090 inch, the cover composed of a thermoplastic material, the cover having a Shore D hardness less than 58 as measured on the golf ball;
   wherein the golf ball has COR at 143 feet per second of 78.2 to 80.5, and wherein the golf ball has a innersphere having a diameter in the range of 1.60 to 1.78 inches, a plurality of smooth portions on the surface of the innersphere and a plurality of lattice members.

3. A golf ball comprising:

a core having a diameter of 1.53 inches to 1.55 inches, the core having a PGA compression of 60 to 80 points, the core comprising a polybutadiene material; and a cover composed of an ionomer blend formed from a high acid ionomer resin neutralized with zinc in a range of 20 to 40 weight percent of the ionomer blend, and a terpolymer neutralized with magnesium in a range of 80 to 60 weight percent of the ionomer blend, the cover having a thickness of 0.060 inch to 0.090 inch, the cover having a Shore D hardness less than 58 as measured on the golf ball;

wherein the golf ball has COR at 143 feet per second of 78.2 to 80.5, and wherein the golf ball has an innersphere having a diameter in the range of 1.60 to 1.78 inches, a plurality of smooth portions on the surface of the innersphere and a plurality of lattice members.

4. A golf ball comprising:

a core having a diameter of 1.53 inches to 1.55 inches, the core having a PGA compression of 60 to 80 points; and a cover composed of a thermoplastic material, the cover having a thickness of 0.060 inch to 0.090 inch, the cover having a Shore D hardness less than 58 as measured on the golf ball;

wherein the golf ball has a COR that is greater than 0.790 points at 143 feet per second, and a true spin greater than 5200 rotations per minute off a sand wedge at a swing speed of 50 miles per hour, and wherein the golf ball has an innersphere having a diameter in the range of 1.60 to 1.78 inches, a plurality of smooth portions on the surface of the innersphere and a plurality of lattice members.

* * * * *